No. 878,502. PATENTED FEB. 11, 1908.
C. CAMPO.
GEARING.
APPLICATION FILED NOV. 14, 1906.

4 SHEETS—SHEET 1.

WITNESSES:
W. P. Burke
A. F. Heuman

INVENTOR
Carlo Campo

By Attorneys
Richard

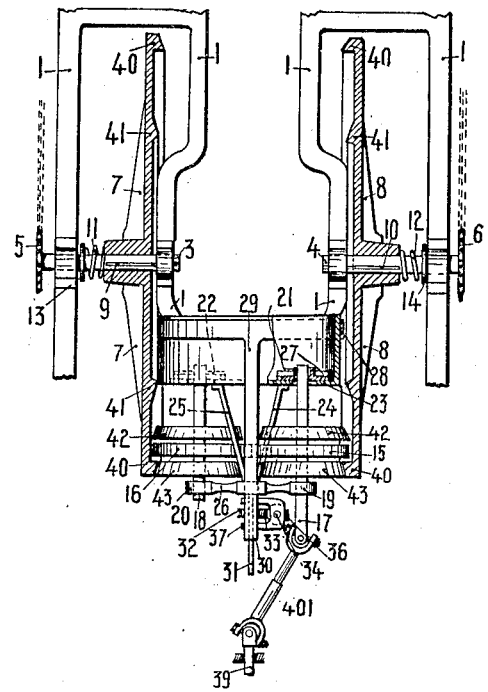

No. 878,502.

PATENTED FEB. 11, 1908.

C. CAMPO.
GEARING.
APPLICATION FILED NOV. 14, 1906.

4 SHEETS—SHEET 3.

WITNESSES:

INVENTOR :
Carlo Campo
By Attorneys,

No: 878,502. PATENTED FEB. 11, 1908.
C. CAMPO.
GEARING.
APPLICATION FILED NOV. 14, 1906.
4 SHEETS—SHEET 4.
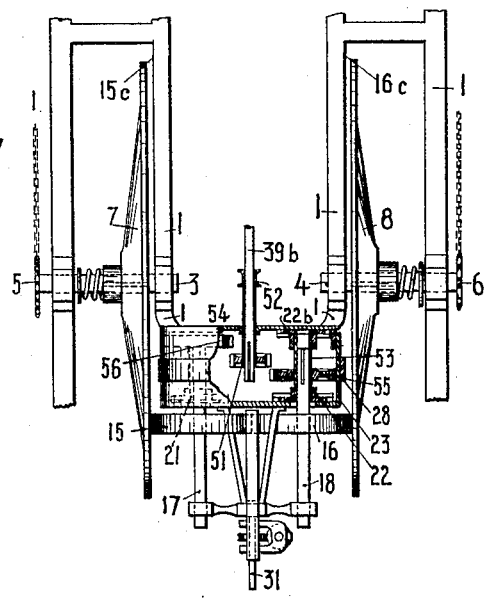
WITNESSES:
W. P. Burk
A. F. Heuman
INVENTOR:
Carlo Campo.
By Attorneys

UNITED STATES PATENT OFFICE.

CARLO CAMPO, OF TURIN, ITALY.

GEARING.

No. 878,502.        Specification of Letters Patent.        Patented Feb. 11, 1908.

Application filed November 14, 1906. Serial No. 343,441.

*To all whom it may concern:*

Be it known that I, CARLO CAMPO, a subject of the King of Italy, residing at Turin, Italy, Via Artisti 38, have invented certain new and useful Improvements in Gearing, of which the following is a full, clear, and exact specification.

This invention has for its object the transmission of motion from one driving shaft to two other shafts and is especially suitable for driving the wheels of a vehicle. This arrangement, which is particularly applicable to automobiles, offers great facilities for obtaining variations in speed and for reversing.

The accompanying drawings illustrate the invention.

Figure 1:
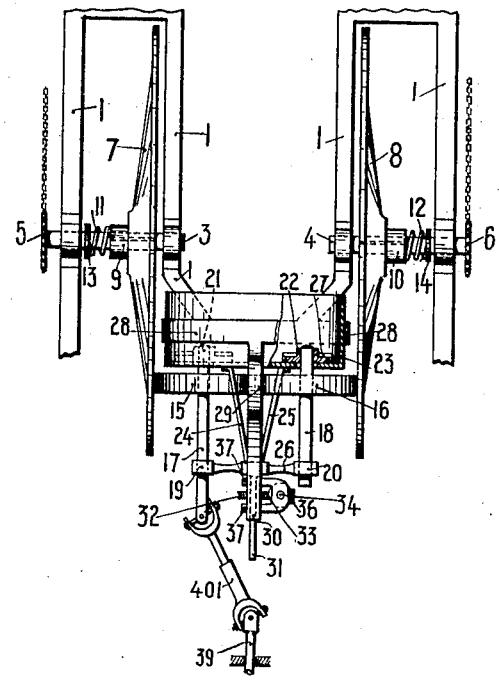
Figure 2:
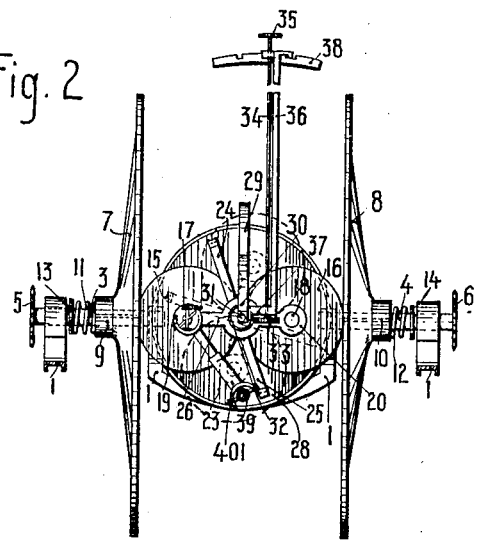
Figure 5:
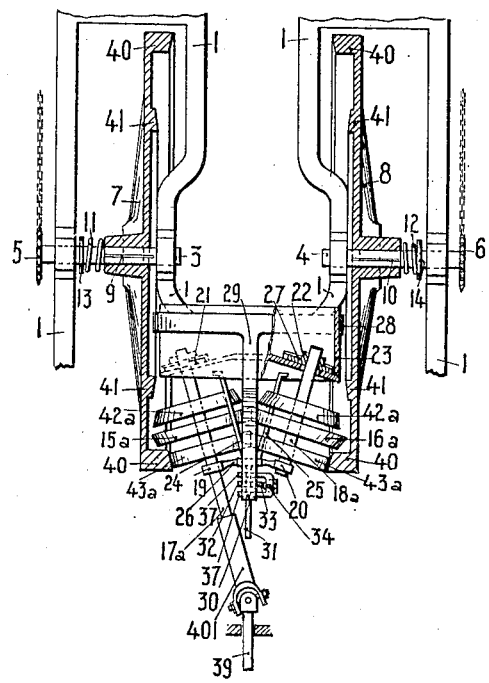
Figure 6:
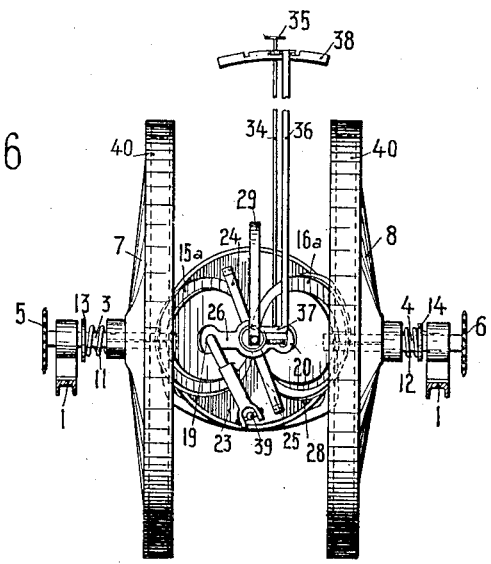

Figures 1 and 2 show respectively in plan and elevation a more efficient way of carrying out the invention. Figs. 3 and 4 are like views of a modification. Figs. 5 and 6 show respectively in plan and elevation a modification. Fig. 7 is a plan of another modification.

1 is the frame of the machine. The frame carries two shafts, turning in suitable supports and connected to differential shafts 3 and 4 carrying the chain wheels 5 and 6 which are connected to the wheels of the vehicle. Two disks 7 and 8 are keyed to the shafts and are free to move axially upon them. This result is obtained by any suitable arrangement such as a groove and feather 9 and 10. The shafts 3 and 4 are surrounded by springs, for example by spiral springs 11 and 12, which press both against the hubs of the disks 7 and 8 and also against abutments 13 and 14; thus pressing the disks towards each other.

The disks 7 and 8 cause two friction wheels 15 and 16 to press against each other; these wheels being keyed upon the spindles 17 and 18, and turn in suitable bearing 19, 20, 21 and 22. The bearing 21 and 22 are mounted upon a drum shaped support 23. The drum 23 is rigidly connected by means of arms 24 and 25 to the crosshead 26 which carries at its ends the said bearings 19 and 20. The bearings 21 and 22 or at least one of them are mounted upon the support 23 in such a manner as to be capable of a slight displacement; this may be attained for example by causing the bearing to pass through guides such as 27, with the object of allowing a slight displacement of the friction wheels 15 and 16 under the effect of the pressure exerted upon them by the disks 7 and 8. The bearings 19 and 20 should be made so as to allow of a certain amount of play to the spindles 17 and 18. The drum support 23 is mounted in such a manner as to be able to turn in the collar 28 fixed to the frame 1. This collar carries a fixed arm 29, which is bent in such a manner as to form at its lower end a kind of support provided with a hole, through which freely passes a spindle 31 fixed to the crosshead 26. Upon this spindle 31 is keyed a worm wheel 32 gearing with a worm 33, fixed to a vertical shaft 34, the upper end of which terminates in a hand wheel 35. The shafts 34 can turn in bearings formed in a lever 36, whose lower end terminates in a fork, the arms 37 of the fork being pivoted to the spindle 31. The upper portion of the lever 36 may be fixed in suitable notches formed in a guide or quadrant, fixed to the frame of the machine. By removing this lever from the quadrant 38, it can be moved laterally by hand in order to rotate the spindle 31 and consequently the crosshead 37 fixed to this spindle, and consequently the whole system carrying the spindles 17 and 18 and the friction wheels 15 and 16 is turned. The support 23 turns in the collar 28 while the spindle 31 turns in a bearing 30. Upon the turning of the whole system the wheels or friction wheels 15 and 16 are no longer in contact with the disks 7 and 8, so that the whole system can be moved forwards or backwards. The spindle 31 then slides longitudinally in its bearing while the drum 23 also slides longitudinally in the collar 28. By causing the friction wheels 15 and 16 to approach or pass further from the center of the disks 7 and 8 the speed is either increased or diminished. When the system is in the desired position the lever 36 is brought back into its vertical position and it is evident that the friction wheels will again immediately come into contact with the disks 7 and 8 so that the transmission of motion continues at the new speed.

One of the spindles 17 or 18, for example 17, is connected to the driving shaft 39 through a telescopic shaft and a Cardan joint 401. It will be seen therefore, that in the arrangement described, movement of the driving shaft 39 can be transmitted to the chain wheels 5 and 6 with the speed desired; changes of speed being extremely easily obtained in a practical manner. Moreover, after the system has been placed in the position in which the friction wheels are not in contact with the disks, the whole being in the position indicated in dots in Fig. 2, if the hand wheel 35 be actuated, then by reason of the worm 33 gearing with the worm wheel 32, the spindle 31 can be turned 180° so that the friction wheel 15 comes into contact with the disk 8 and reciprocally the friction wheel 16 comes into contact with the disk 7 in such a manner as to obtain the reversal of the motion. The arrangement described is equally applicable to obtaining changes of speed as to reversing.

In the form indicated in Figs. 1 and 2 the transmission takes place, as will be seen, by means of cylindrical wheels 15 and 16 and flat disks 7 and 8; in this arrangement slip occurs between the surfaces in contact and so a very efficient gearing does not result. The modification shown in Figs. 3 and 4 is designed to meet this; it is essentially the same arrangement as is shown in Fig. 1 but the disks 7 and 8 are provided with beveled edges 40 and 41 which gear with the bevel friction wheels 42 and 43 arranged in pairs and driven by the wheels 15 and 16. In Figs. 3 and 4 the system transmitting the motion is shown turned 180° with respect to the position indicated in Figs. 1 and 2, in such a manner that in the position shown in the latter figures, the movement will be in a direction opposite to that taking place in the position of the first figures.

Figs. 5 and 6 show a similar arrangement to that shown in Figs. 3 and 4 with the difference that the spindles 17$^a$ and 18$^a$ are converging in place of being parallel and that consequently, the pairs of wheels 15$^a$ and 16$^a$ instead of being cylindrical are beveled. This arrangement has the advantage that the transmission of motion of the shaft 39 to the wheels 15$^a$ and 16$^a$ takes place merely by means of one Cardan joint in place of two. Fig. 7 is a modified form of Fig. 1.

According to Fig. 7 the driving shaft is mounted at 39$^b$ in the reverse position to that previously indicated. It carries a toothed wheel 51 which is keyed upon it but can slide axially when desired, being guided by a sleeve 52. The spindles 17 and 18 can move freely when it is necessary to change speed. Movement is transmitted to them through sleeves 53 and 54 which are keyed upon the spindles so as to allow of their displacement. The sleeves 53 and 54 partake in the movement of the toothed wheels 55 and 56 being fixed to them; the driving shaft 51 can gear with either of the toothed wheels 55 and 56 but when it is in its mid position there is no transmission of motion; when it is in gear with the wheel 54 motion takes place in one direction and if on the contrary it is caused to engage with the wheel 55, movement takes place in an opposite direction. With this arrangement it is not necessary to turn the whole system about the spindle 31 in order to obtain the reversal of the motion but this must be done in order to move the parts out of contact when it is desired to move the system longitudinally in order to change the speed, unless it is preferred to so actuate the disks, as to separate them from the friction wheels as may be done in the arrangement shown in Figs. 1 to 6.

What I claim is:

1. Mechanism for the transmission of motion, comprising shafts to be driven, disks movable longitudinally on said shafts, springs for pressing said disks inwardly, a stationary collar located between said disks, a drum rotatably supported by said collar, friction wheels carried by said drum and engaging with the disks, means for driving the wheels, means for moving the drum longitudinally in the collar for bringing the wheels into engagement with different parts of the disks and means for rotating the drum to bring different wheels into engagement with the disks to reverse the motion of the disks.

2. Mechanism for the transmission of motion comprising shafts to be driven, disks movable longitudinally thereon, said disks having conical rims, springs for forcing said disks inwardly, a supporting structure between the disks, two converging shafts on said structure, bevel wheels on said shafts engaging with each other, a driving shaft connected with one of said shafts, conical wheels on said shafts and means for bringing in mesh said conical wheels with either of the conical rims on the disks.

3. Mechanism for the transmission of motion comprising shafts to be driven, disks movable longitudinally thereon, said disks having conical rims thereon, springs for forcing said disks inwardly, a supporting structure between the disks, two shafts on said structure, friction wheels on said shafts engaging with each other, a driving shaft connected with one of said shafts, conical wheels on said shafts and means for bringing in mesh said conical wheels with either of the conical rims on the disks.

In witness whereof, I have hereunto signed my name in the presence of two subscribing witnesses.

CARLO CAMPO.

Witnesses:
 FALICE BAZETTO,
 FERRARIS GIOVANNI.